(12) United States Patent
Beaurepaire et al.

(10) Patent No.: US 10,904,706 B2
(45) Date of Patent: Jan. 26, 2021

(54) METHOD AND APPARATUS FOR PROVIDING CONTEXTUAL CONTENT FOR AN END-TO-END SEAMLESS EXPERIENCE DURING AN AUTONOMOUS VEHICLE TRIP

(71) Applicant: HERE GLOBAL B.V., Eindhoven (NL)

(72) Inventors: Jerome Beaurepaire, Berlin (DE); Wiebke Hurrelmann-Wieding, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/380,731

(22) Filed: Apr. 10, 2019

(65) Prior Publication Data

US 2020/0329342 A1  Oct. 15, 2020

(51) Int. Cl.
*H04W 4/029*  (2018.01)

(52) U.S. Cl.
CPC ................ *H04W 4/029* (2018.02)

(58) Field of Classification Search
CPC .... G05D 1/0088; G05D 1/021; G05D 1/0022; G05D 1/0061; G05D 1/0274; G05D 2201/0212; G05D 1/0246; G05D 1/0276; G05D 1/0297; G05D 1/0011; G05D 1/0016; G05D 1/0044; G05D 1/0287; G05D 2201/0216; G05D 1/0217; G05D 1/0676; H04W 4/029; H04W 4/023; H04W 4/025; H04W 4/38; H04W 8/183; H04W 4/024; H04W 4/027; H04W 4/02; H04W 4/046; H04W 4/44; H04W 4/48; H04W 4/021; H04W 4/60; H04W 4/40; H04W 12/00508; H04W 48/04; H04W 4/42; H04W 4/06; H04W 4/46; H04W 84/042; H04W 88/02; H04W 4/90; H04W 84/005; H04W 64/00; H04W 64/006; H04W 8/18; H04W 52/223; H04W 4/50; H04W 8/22; G06Q 10/0833;
(Continued)

(56) References Cited

U.S. PATENT DOCUMENTS 7,599,795 B1 * 10/2009 Blumberg ............... G01C 21/20
                                                              701/426
10,123,078 B1 * 11/2018 McCarty .......... H04N 21/41422
(Continued)

FOREIGN PATENT DOCUMENTS

WO      2020081576 A1     4/2020

OTHER PUBLICATIONS

Office Action for related European Patent Application No. 20171645.3-1224, dated Aug. 21, 2020, 9 pages.

*Primary Examiner* — Nimesh Patel
(74) *Attorney, Agent, or Firm* — Ditthavong & Steiner, P.C.

(57) ABSTRACT

An approach is provided for presenting contextual content for an end-to-end seamless experience during an autonomous vehicle trip. The approach, for example, involves retrieving content related to at least one context associated with a destination of a vehicle. The approach also involves adapting the content to one or more presentation devices in the vehicle. The approach further involves initiating a presentation of the adapted content on the one or more presentation devices to provide a simulation of the at least one context associated with the destination as the vehicle travels towards the destination.

18 Claims, 11 Drawing Sheets

(58) Field of Classification Search
CPC ........... G06Q 10/0835; G06Q 10/0836; G06Q
10/0838; G06Q 30/0269; G06Q 10/02;
G06Q 50/30; G06Q 10/1093; G06Q
30/0266; G06Q 30/0265; G06Q 30/0261;
G06Q 10/047; G06Q 20/32; G06Q
30/0613; G06Q 30/0231; G06Q 30/0257;
G06Q 30/0267; G06Q 30/0283; H04L
41/026; H04L 67/10; H04L 67/18; H04L
67/303; H04L 1/0006; H04L 67/306;
H04L 67/12; H04L 51/02; H04L 63/102;
H04L 51/18; H04L 41/14; H04L 65/4084;
G01C 21/362; G01C 21/00; G01C
21/3492; G01C 21/3415; G01C 21/3638;
G01C 21/3484; G01C 21/3602; G01C
21/3617; G01C 21/3614; G01C 21/3635;
G01C 21/365; G01C 21/367; G01C
21/3647; G01C 21/3676; G01C 21/3667;
G01C 21/3691; G01C 21/3632; G01C
21/3661; G01C 21/3407; G01C 21/3626;
G01C 21/3641; G01C 21/3658; G01C
21/3679; G01C 21/26; G01C 1/3691;
G01C 21/3461; G01C 21/3682; G01C
21/3694; G01C 21/3611; G01C 21/3644;
Y02D 70/00; Y02D 70/1262; Y02D
70/142; Y02D 70/144; Y02D 70/162;
Y02D 70/164; Y02D 70/166; Y02D
70/26; B60W 2550/402; B60W 30/09;
B60W 50/0097; B60W 50/06; B60W
2050/146; B60W 2540/28; B60W
2250/14; B60W 2250/141; B60W
2720/24; B60W 30/00; B60W 30/02;
B60W 30/182; B60W 40/06; B60W
50/12; B60W 40/08; B60W 40/09; B60W
50/0098; B60W 50/14; B60W 30/16;
B60W 2050/143; B60W 20/15; B60W
2550/40; B60W 2050/0095; B60W
2550/14; B60W 40/04; B60W 2550/141;
G08G 1/096725; G08G 1/096741; G08G
1/096844; G08G 1/096805; G08G
1/096811; G08G 1/164; G08G 1/012;
G08G 1/0175; G08G 1/096716; G08G
1/09675; G08G 1/0969; G08G 1/0112;
G08G 1/096816; G08G 1/096888; G08G
1/123; G08G 1/13; G08G 1/205; G08G
1/0129; G08G 1/096827; G08G 1/09685;
G08G 1/096861; G08G 1/202; G08G
1/096775; G08G 1/0133; G08G
1/096838; B60K 35/00; B60K 2370/11;
B60K 2370/146; B60K 2370/15; B60K
2370/52; B60K 2370/179; B60K
2370/334; B60K 2370/5915; B60K
2370/797; B60K 31/0008; B60K
2370/166; B60K 2370/21; B60K
2370/1438; B60K 2370/1464; B60K
2370/178; B60K 2370/566; G06F 16/583;
G06F 3/0488; G06F 16/24575; G06F
16/252; G06F 2203/04803; G06F 3/013;
G06F 3/0482; G06F 3/04842; G06F 3/14;
G06F 16/29; G06F 3/167; G06F 11/328;
G06F 3/0481; G06F 3/0484; G06F 17/00
See application file for complete search history.

(56) References Cited

U.S. PATENT DOCUMENTS

| | | | |
|---|---|---|---|
| 2010/0169753 A1 | 7/2010 | Chen et al. | |
| 2010/0274410 A1 | 10/2010 | Tsien et al. | |
| 2011/0296287 A1 | 12/2011 | Shahraray et al. | |
| 2013/0030645 A1 | 1/2013 | Divine et al. | |
| 2013/0211656 A1* | 8/2013 | An | G05D 1/0221 |
| | | | 701/25 |
| 2015/0345980 A1 | 12/2015 | Subramanian et al. | |
| 2016/0097646 A1* | 4/2016 | Alonso | G06Q 30/02 |
| | | | 701/408 |
| 2017/0090480 A1* | 3/2017 | Ho | G05D 1/0214 |
| 2017/0103571 A1* | 4/2017 | Beaurepaire | G01C 21/3667 |
| 2017/0146354 A1* | 5/2017 | Boss | B60L 58/12 |
| 2018/0136655 A1* | 5/2018 | Kim | B60N 2/002 |
| 2018/0136656 A1* | 5/2018 | Rasmusson, Jr. | G01C 21/3638 |
| 2018/0209803 A1* | 7/2018 | Rakah | G08G 1/096844 |
| 2018/0278920 A1 | 9/2018 | Stefan | |
| 2019/0122561 A1* | 4/2019 | Shimizu | G08G 1/205 |

* cited by examiner

METHOD AND APPARATUS FOR PROVIDING CONTEXTUAL CONTENT FOR AN END-TO-END SEAMLESS EXPERIENCE DURING AN AUTONOMOUS VEHICLE TRIP

BACKGROUND

Autonomous vehicles are able to operate without driver or user input, thereby enabling the user to devote his or her attention to other non-driving tasks or functions. This, in turn, creates opportunities for service providers and vehicle manufacturers to offer compelling services and applications to vehicle users and passengers. As a result, service providers and vehicle manufacturers face significant technical challenges to leveraging the time spent during trips in autonomous or other vehicles in a way that is useful for users and passengers.

SOME EXAMPLE EMBODIMENTS

As a result, there is a need for making a vehicle (e.g., an autonomous vehicle) part of an end-to-end seamless experience by retrieving context related to a destination of a trip and then reconstructing the context in the vehicle while on the trip.

According to one embodiment, a computer-implemented method comprises retrieving content related to at least one context associated with a destination of a vehicle. The method also comprises adapting the content to one or more presentation devices in the vehicle. The method further comprises initiating a presentation of the adapted content on the one or more presentation devices to provide a simulation of the at least one context associated with the destination as the vehicle travels towards the destination.

According to another embodiment, an apparatus comprises at least one processor, and at least one memory including computer program code for one or more computer programs, the at least one memory and the computer program code configured to, with the at least one processor, cause, at least in part, the apparatus to retrieve content related to at least one context associated with a destination of a vehicle. The apparatus is also caused to adapt the content to one or more presentation devices in the vehicle. The apparatus is further caused to initiate a presentation of the adapted content on the one or more presentation devices to provide a simulation of the at least one context associated with the destination as the vehicle travels towards the destination.

According to another embodiment, a non-transitory computer-readable storage medium carries one or more sequences of one or more instructions which, when executed by one or more processors, cause, at least in part, an apparatus to retrieve content related to at least one context associated with a destination of a vehicle. The apparatus is also caused to adapt the content to one or more presentation devices in the vehicle. The apparatus is further caused to initiate a presentation of the adapted content on the one or more presentation devices to provide a simulation of the at least one context associated with the destination as the vehicle travels towards the destination.

According to another embodiment, an apparatus comprises means for retrieving content related to at least one context associated with a destination of a vehicle. The apparatus also comprises means for adapting the content to one or more presentation devices in the vehicle. The apparatus further comprises means for initiating a presentation of the adapted content on the one or more presentation devices to provide a simulation of the at least one context associated with the destination as the vehicle travels towards the destination.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing contextual content for an end-to-end seamless experience during an autonomous vehicle trip are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
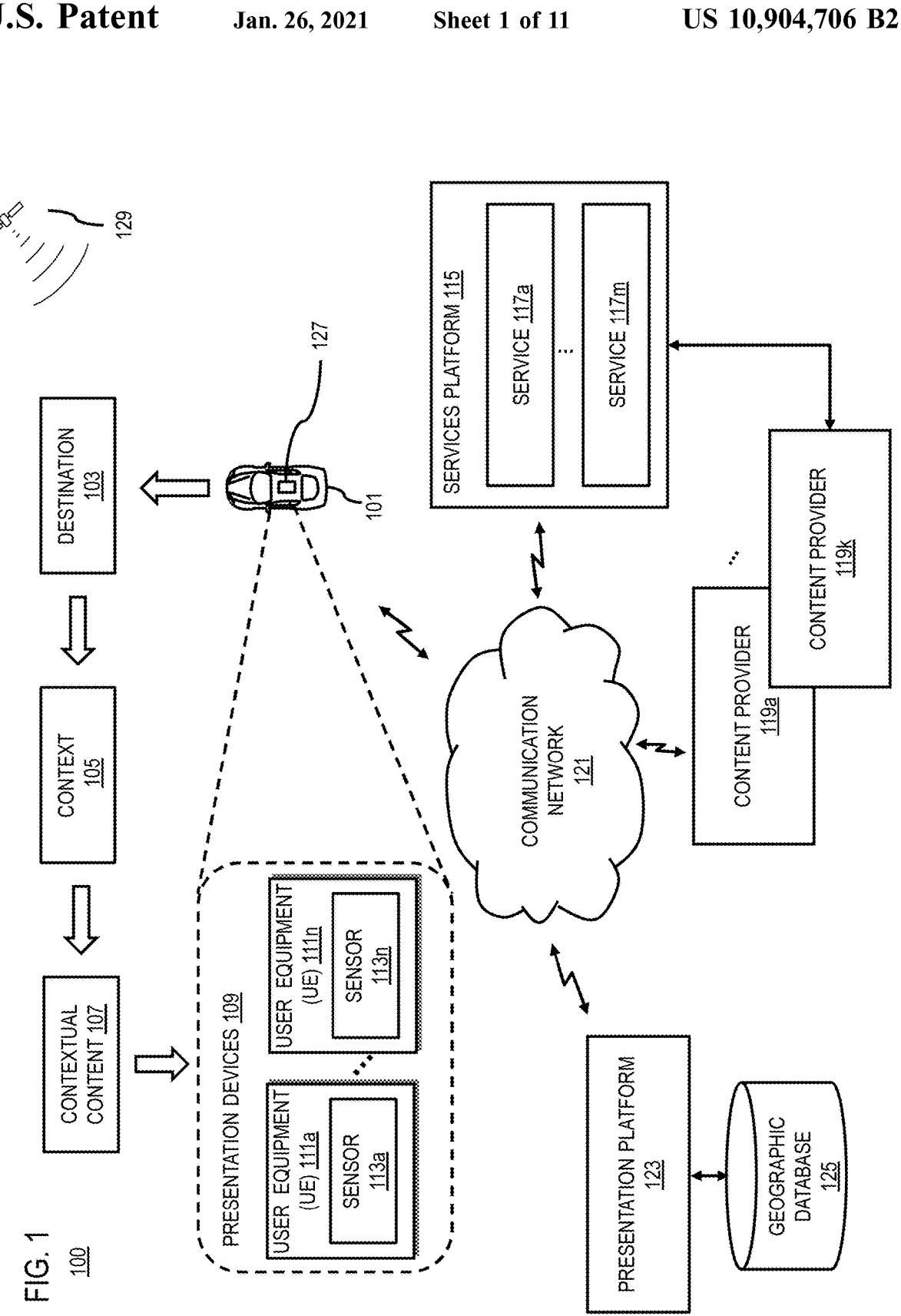
FIG. 1 is a diagram of a system capable of providing contextual content for an end-to-end seamless experience during a vehicle trip, according to one embodiment.

FIG. 1 is a diagram of a system capable of providing contextual content for an end-to-end seamless experience during a vehicle trip, according to one embodiment. As autonomous vehicles (e.g., vehicle 101) become more prevalent, people will likely being spending lots of time traveling in these vehicles as passengers without having to actually drive or operate the vehicle. As a result, people will have more time during trips to attend to non-driving tasks, thereby providing service providers and vehicle manufacturers with the opportunity to provide new and compelling services that can be consumed while traveling in autonomous vehicles. For example, service providers face significant technical challenges to usefully leveraging the time people spend traveling in autonomous or other vehicles.

To address these challenges, the system 100 introduces a capability that allows passengers or users of a vehicle 101 (e.g., an autonomous vehicle) to live an end-to-end experience by contextually retrieving relevant content for their vehicle related to the destination where they are going. In one embodiment, the system 100 identifies a destination 103 of the vehicle 101, and determines a context 105 (e.g., a visual environment, audio environment, people or things, etc.) occurring or otherwise associated with the destination 103. The system 100 then retrieves contextual content 107 (e.g., videos, images, sounds, models, etc.) that can be used to simulate or recreate the context 105 of the destination 103 using one or more presentation devices 109 equipped in the vehicle 101. The presentation devices 109 can include multiple user equipment (UE) devices 111a-111n (also collectively referred to as UEs 111) that can provide any number of user interface types (e.g., visual, audio, touch, other sensory, etc.) and respective sensors 113a-113n (also collectively referred as sensors 113) for presenting contextual content 107 and/or interacting with users/passengers. In this way, the vehicle 101 can be part of an end-to-end experience that allows a user or passenger to begin experiencing a destination 103 from the beginning of the trip that would otherwise start upon arrival at the destination 103.

In summary, the system 100 introduces capabilities including but not limited to

Determination of a destination context 105 (e.g., atmospheric environment) and/or passenger context (e.g., familiarity with the destination or destination context);

Retrieving relevant contextual content 107 (e.g., content that depicts, represents, or otherwise indicates the destination and/or passenger context) from online sources (e.g., a services platform 115, one or more services 117a-117m—also collectively referred to as services 117, one or more content providers 119a-119k—also collectively referred to as content providers 119, etc.) over a communication network 121;

Prioritizing the contextual content 107 to be delivered based on relevance to the destination and/or passenger context; and Adapting the contextual content 107 to various medium, screen sizes, and formats of the presentation devices 109 of the vehicle 101.

Figure 2:
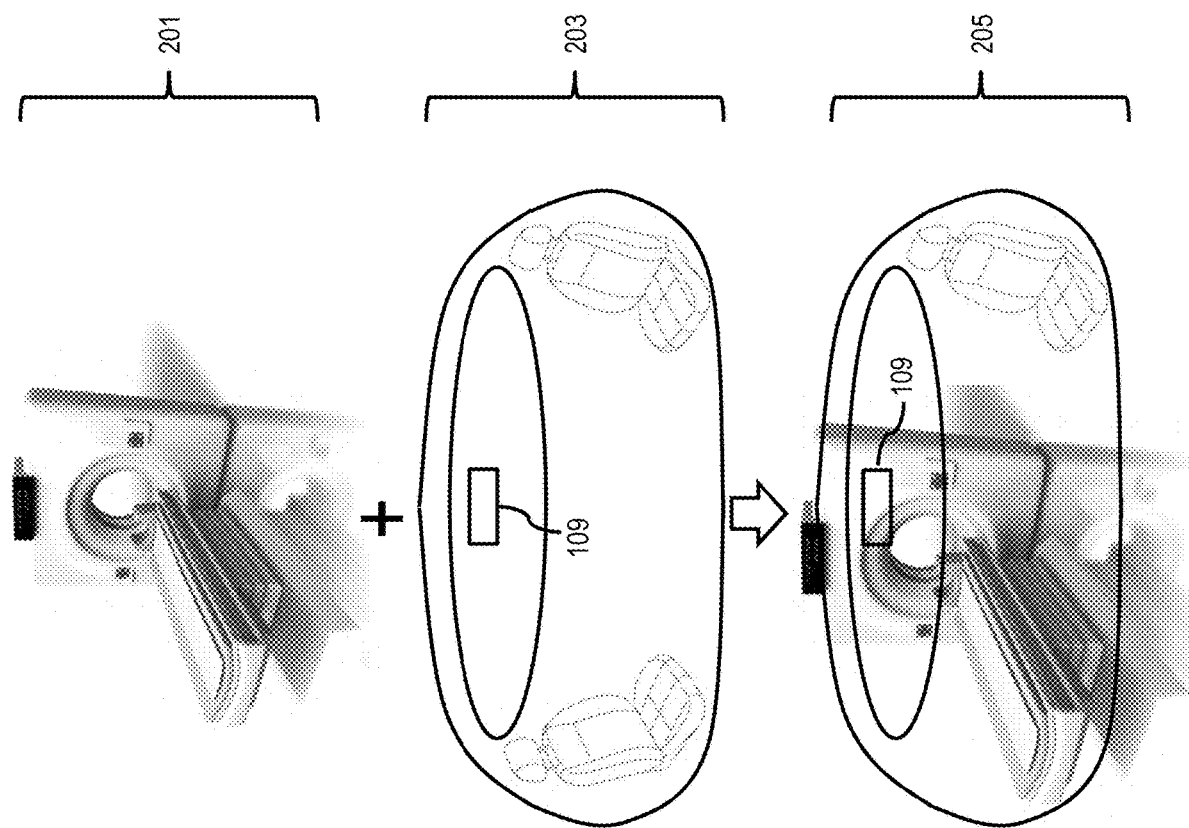
FIG. 2 is a diagram illustrating an example of contextual content presented during a vehicle trip, according to one embodiment.

FIG. 2 is a diagram illustrating an example of contextual content presented during a vehicle trip, according to one embodiment. In the example of FIG. 2, parents are using an autonomous vehicle 101 to take a child to a hospital (i.e., the destination 103) to take a magnetic resonance imaging (MIll) scan. The system 100 (e.g., via a presentation platform 123) determines the context 105 associated with the destination 103 (e.g., the context 105 being taking an MIll scan). The system 100 can then retrieve or query for content 201 related to the context 105. The contextual content 201 can include images of the actual MIll machine and/or room that will be used (e.g., queried from the hospital or other data store such as a geographic database 125 with indoor map data and/or indoor imagery) as well as sounds of the MM machine in operation. Other contextual content (not shown) can also be retrieved such as but not limited to images of the hospital personnel that will be operating the machine or meeting the parents and child.

In one embodiment, the contextual content 201 (e.g., MIll images and sounds) can then be presented via a presentation device 103 in the interior 203 of the vehicle 101. For example, the sounds of the contextual content 201 can be subtly blended into the vehicle environment (e.g., as background sounds through a vehicle sound system) over a period of time before reaching the destination (e.g., a hospital with MIll equipment) so that passengers (e.g., kids) could progressively get familiar with the sounds or context of the destination, As shown, the presentation device 103 is a projector that can display the contextual content 107 on the interior 203 of the vehicle 101 as shown in presentation 205. To generate the presentation 205 from the contextual content 107, the presentation platform 123 can determine the presentation capabilities (e.g., size, format, location in the interior 203, etc.) of the presentation device 109 and convert the contextual content 107 (e.g., crop, resize, reformat, etc.) based on the presentation capabilities. In this way, the contextual content 107 can be adapted and applied to the interior 203 of the vehicle 101 to simulate being in the Mill scanning room at the destination 105. This end-to-end experience enables the system 100 to begin preparing the parents and/or child for the experience of taking an Mill even before reaching the hospital. In other words, the system 100 can retrieve content 201 related to the hospital and more precisely about the Mill machine (e.g., visuals, sound effects, etc.) and apply those to the interior 203 autonomous vehicle being used by the child and her/his parents on the way to hospital (or even in some other designated previous time period, e.g., days/weeks before going to the destination 103 of the hospital). For example, in one embodiment, the system 100 can use the presentation platform 123 or a module thereof to determine when one or more passengers (e.g., the child and/or his/her parents) is expected to travel a destination and then determine how long before traveling to the destination, the system 100 should start preparing the user or passenger a context or event occurring at the destination. The determination of how long to prepare (e.g., the designated pervious time period mentioned above) can be based on a variety of factors including by not limited to type of context/event or destination, duration of trip, user preference, user contextual information (e.g., user demographic data), type of contextual content, etc.

Figure 3A:
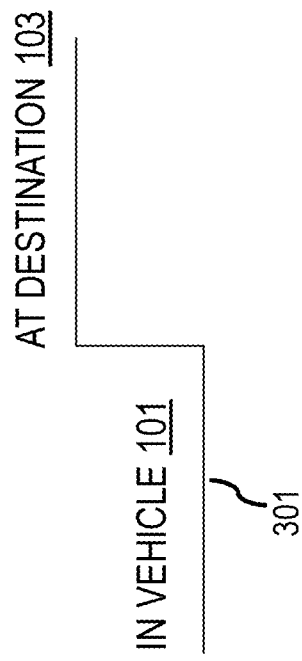
FIGS. 3A and 3B are graphs illustrating transitional experiences when traveling in a vehicle to a destination, according to one embodiment.
Figure 3B:
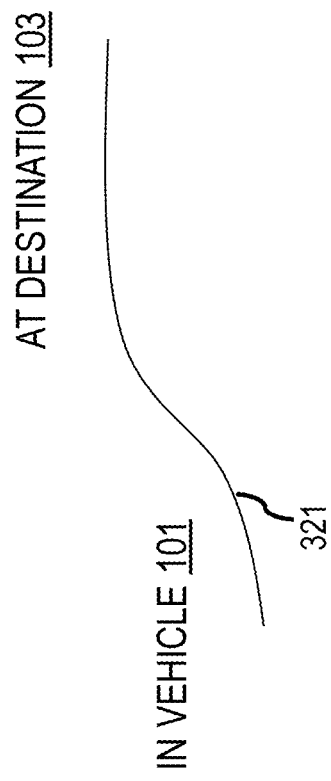

By providing this contextual content 107, the system 100 can ease the transition often faced by passengers when beginning a trip and then reaching a destination. FIGS. 3A and 3B are graphs illustrating transitional experiences when traveling in a vehicle 101 to a destination, according to one embodiment. As shown in FIG. 3A, generally, users who are travelling to a destination 103 have a first experience in the transport mode (e.g., car, public transport, walking, etc.) and another one when arriving at destination. This is described simplistically with the graph 301 that shows an abrupt transition from the experience of being in a vehicle 101 while in transit to the experience of being at the destination 103. In contrast, the embodiments of described herein of simulating a destination context by presenting contextual content related to the destination before reaching the destination enables the user to prepare for a more gradual transition as shown in the graph 321 of FIG. 3B that curves from the experience of being in vehicle 101 to the experience of being at the destination 103. Accordingly, the system 100 enables the user to engage (when relevant) with the experience of being at the destination 104 earlier, e.g., while traveling to the destination 103 in the autonomous vehicle 101, so that the transition is made easier and that the time in the car is leveraged to possibly prepare for what is expecting the user at destination 103.

As illustrated above, the embodiments described herein are not simply about retrieving content like a food menu when going to a restaurant or a movie trailer when going to the cinema, but about recreating the context, atmosphere, environment, etc. of the restaurant or cinema or other destination through contextually relevant content before reaching the destination. As more autonomous vehicles 101 become more available with increasingly sophisticated presentation devices 109 and technologies that support more immersive media and sensory experiences, the system 100 can retrieve and adapt more contextual content that can provide improved simulation and/or recreation of a range of contexts (e.g., environments and related dynamic conditions such as lighting, weather, different people/things, etc.) associated with user destinations. Therefore, the system 100 advantageously creates contextual awareness about the destination and helps passengers be better prepared to what is expecting them at their destination, enabling seamless transition and creating real end-to-end experiences (e.g., a consistent experience throughout the entire journey from beginning to reaching the destination).

It is noted that although the various embodiments are discussed with respect to providing contextual content about destinations in autonomous vehicles, it is contemplated that the embodiments are applicable to non-autonomous or semi-autonomous vehicles 101. In addition, it is further contemplated that the embodiments are applicable to travel using non-vehicular modes of transport such as walking or other pedestrian means (e.g., using presentation devices 109 that are wearable or carried on person such as but not limited to augmented or virtual reality headsets, personal devices, etc.

Figure 4:
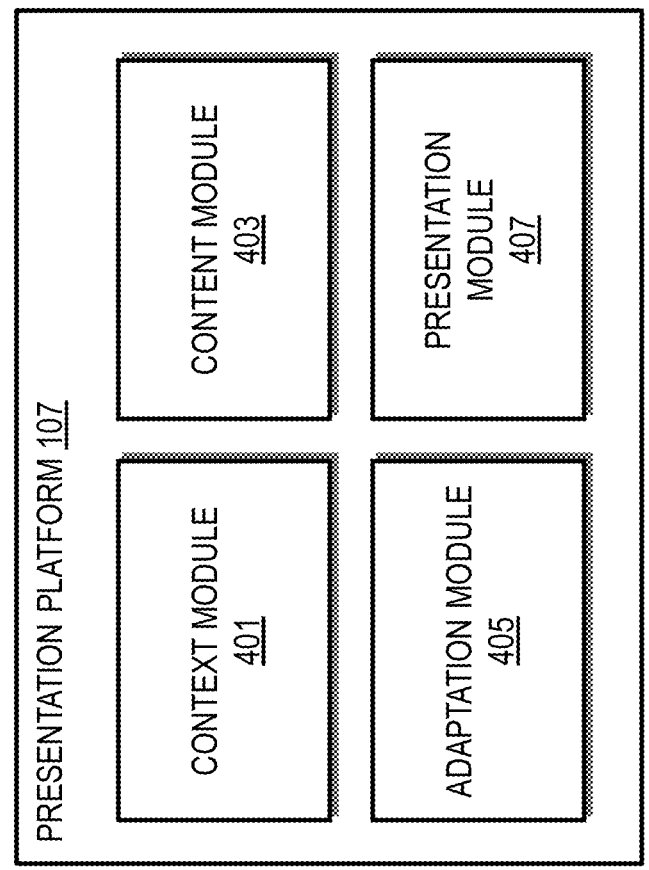
FIG. 4 is a diagram of the components of a presentation platform, according to one embodiment.

In one embodiment, the presentation platform 123 includes one or more components for providing contextual content for an end-to-end seamless experience during a vehicle trip according to the various embodiments described herein. As shown in FIG. 4, the presentation platform 123 includes a context module 401, a content module 403, an adaptation module 405, and a presentation module 407. The above presented modules and components of the presentation platform 123 can be implemented in hardware, firmware, software, or a combination thereof. It is contemplated that the functions of these components may be combined or performed by other components of equivalent functionality. In one embodiment, these functions include but are not limited to: computation of navigation routes, destination context determination, user context determination (e.g., familiarity with a destination based on historical mobility data), retrieving content from online sources based on this context, and adapting content to various medium, screen sizes and format. Though depicted as a separate entity in FIG. 1, it is contemplated that the presentation platform 123 may be implemented as a module of any of the components of the system 100 (e.g., a component of the vehicle 101 and/or presentation devices 109). In another embodiment, the presentation platform 123 and/or one or more of the modules 401-407 may be implemented as a cloud-based service, local service, native application, or combination thereof. The functions of these modules are discussed with respect to FIGS. 5-7 below.

Figure 5:
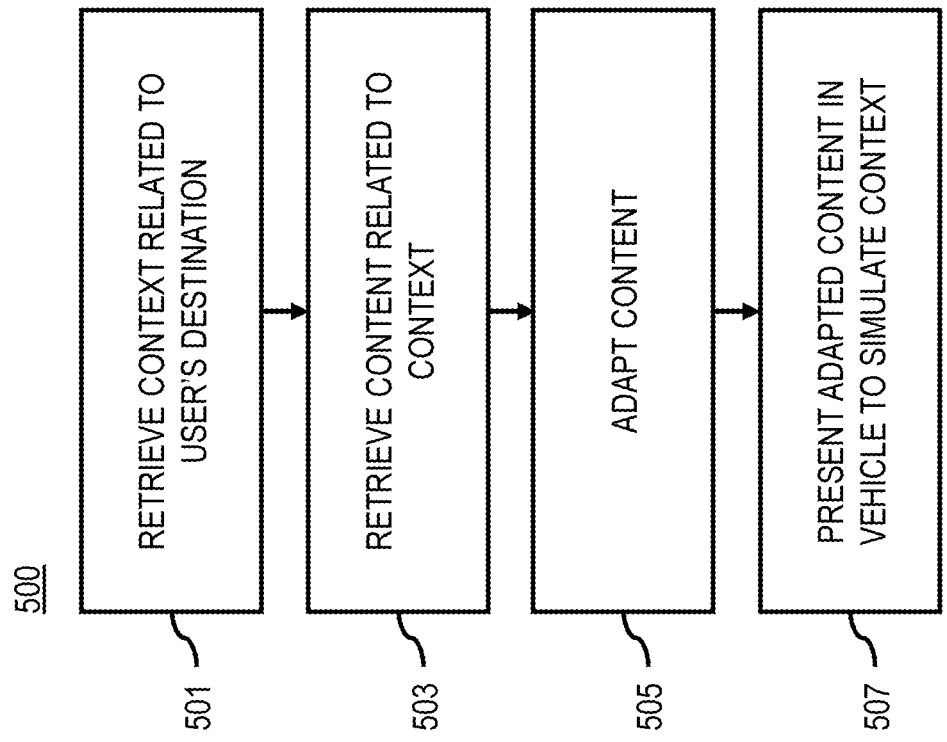
FIG. 5 is a flowchart of a process for providing contextual content for an end-to-end seamless experience during a vehicle trip, according to one embodiment.
Figure 10:
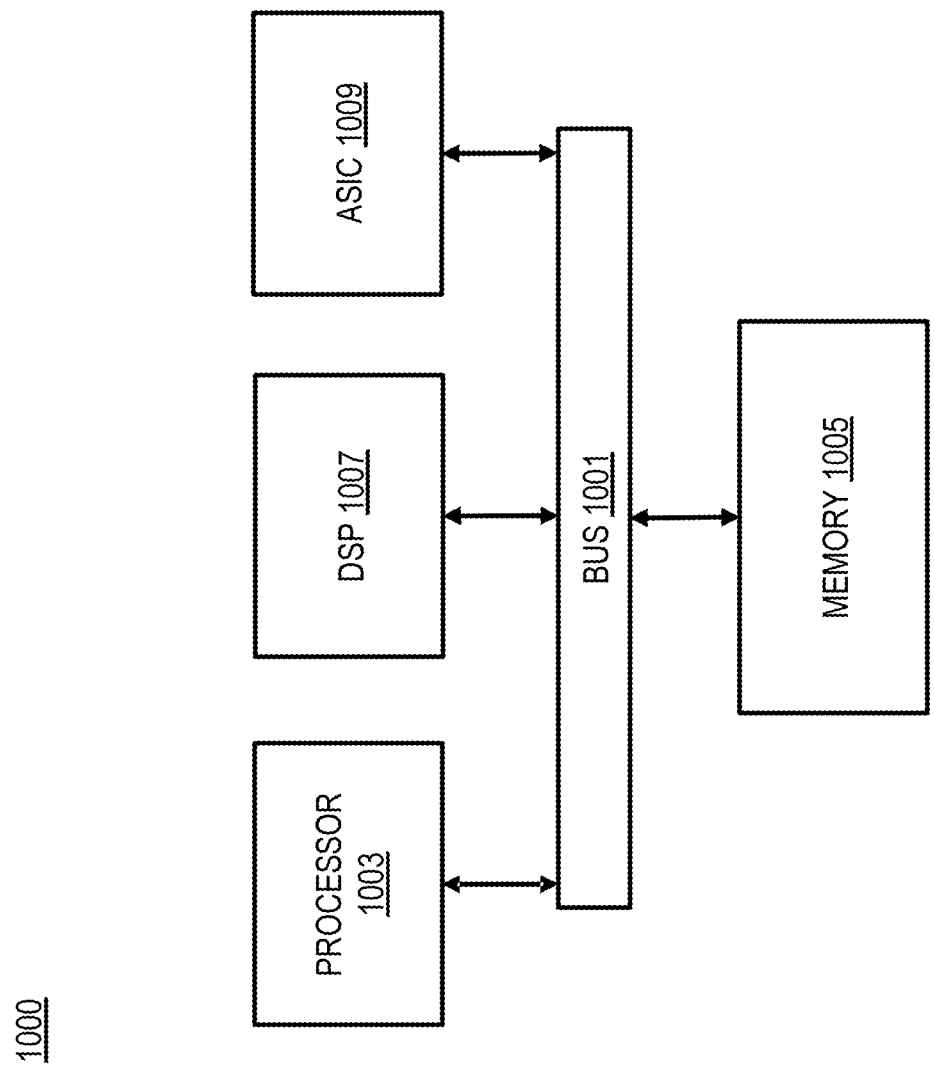
FIG. 10 is a diagram of a chip set that can be used to implement an embodiment.

FIG. 5 is a flowchart of a process for providing contextual content for an end-to-end seamless experience during a vehicle trip, according to one embodiment. In various embodiments, the presentation platform 123 and/or any of the modules 401-407 of the presentation platform 123 may perform one or more portions of the process 500 and may be implemented in, for instance, a chip set including a processor and a memory as shown in FIG. 10. As such, the presentation platform 123 and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, the process 500 uses the various inputs for providing an end-to-end seamless experience to a destination including but not limited to:
User's mobility graph/mobility patterns—historical data indicating travel paths, trajectories, visited locations/ places, etc. collected over a period of time via, for instance, location sensors on devices (e.g., UE 111) carried or associated with a user or vehicle 101;

The set destination(s) of the vehicle 101 or user (e.g., determined implicitly or explicitly);

The autonomous vehicle 101's characteristics and capabilities (e.g., presentation capabilities of the presentation devices 109 of the vehicle 101);

The route/path to the destination(s)—e.g., determined by any navigation routing engine known in the art; and/or Contextual content related to the destination—e.g., available on-demand from the destination or a point-of-interest (POI) at the destination or by other online source (e.g., service platform 115, services 117, content providers 119, etc.).

In step 501, the context module 401 retrieves at least one context related to a user's or a vehicle's destination, next meeting, appointment, etc. (e.g., child going to a hospital or medical office to perform an Mill test). In one embodiment, the context module 401 can predict the destination based on historical mobility data (e.g., a mobility graph storing location data on previously traveled paths, visited places, modes of transport, etc.) of a user of the vehicle 101. The context can be determined directly from characteristics of the destination or a POI at the destination from the geographic database 123 or equivalent data store that provides indoor/outdoor map data (e.g., high-definition map data, relevant POIs, a reality index of the world, etc.). For example, the at least one context includes a visual environment, an audio environment, people that may be encountered, items that may be encountered, an activity that may be encountered, or a combination thereof associated with the destination.

In one embodiment, the context of the destination can also be based on the context of the user or passenger traveling to the destination. For example, user context can be determined from calendar data indicating the type of activity to performed at the destination (e.g., meeting, interview, medical appointment, creative session, sporting event, etc.). In addition or alternatively, context can also be determined from historical mobility data, travel patterns, or equivalent. Then based on the user context, the context module 401 can determine or predict a destination context that is likely to be most relevant to the user context. For example, in the case of an Mill appointment at a hospital destination, the most relevant context may be related to Mill operations at the hospital and not to some other department of the hospital.

In step 503, the content module 403 retrieves content related to the at least one context associated with the destination of the vehicle 101. In other words, based on the context extracted by the system, this system can decide and prioritize the type and format of the content to be retrieved. Similar to determining destination and/or user context above, this content can be gathered based on criteria including but not limited to any combination of the following:

Based on relevance to the context—e.g., based on whether the context has a semantic similarity to the determined destination context, is in the same or similar classification category as the destination context, and/or the like;

Based on passenger context or data—e.g., identity of the users/passengers, how many users/passengers, user demographic data (e.g., age, sex, occupation, etc.);

Based on the duration of the trip—e.g., to determine how much contextual content to retrieve and how to prioritize the content;

Based on the intent of showing the content with respect to the destination—e.g., to relax, prepare for an activity at the destination, warm up for an activity, etc.;

Based on the vehicle's capabilities—e.g., capabilities of the presentation devices 109 of the vehicle 101 such as memory, support formats, spatial arrangement, supported user interfaces, etc.; and User's familiarity to the destination, path to the destination, POIs at the destination, etc.—e.g., based on mobility data.

For example, with respect to the user's familiarity to the place or destination, the content module 401 can process historical mobility data of one or more users of the vehicle 101 to compute a familiarity index. The familiarity index indicates a familiarity level of the one or more users with the destination. For example, the index can compute a familiarity level based on a number of times the destination or POI associated with the destination appears in the one or more user's historical mobility data (e.g., within a most recent time epoch). The content module 401 can then increase the familiarity level and the corresponding familiarity index with an increasing number of times the destination appears in the user's historical mobility data. In additional or alternatively, the familiarity index can be based on virtual visits to the destination determined by a user's search history or internet browsing history. For example, if a user has viewed map data of the destination or POIs at the destination, the familiarity index can be increased.

In one embodiment, if there are more than one user or passenger in a vehicle heading to a common destination, the content module 401 can compute a respective familiarity index for each user or passenger, and then apply any rule, ranking, statistical means, or a combination thereof to determine a consensus familiarity index for the multiple users. For example, the content module 401 can select the minimum, maximum, mean, etc. of the set of familiarity indices as the consensus familiarity index to use. In another embodiment, the content module 401 can determine the relationship among the passengers with the destination or event/context occurring at the destination to determine what familiarity index to use. For example, in a use case where parents are taking a child for an MM scan, the content module 401 can determine that the appointment at the destination is for the child, and so the contextual content should be based on the child's familiarity index. In this case, even if the parents have been to the hospital many times but this is the child's first visit, the content module 401 can select contextual content based on familiarity level corresponding to the first time visit for the child.

In a use case where the multiple users or passengers have different destinations, the content module 401 can present a prompt asking the users or passengers to specify which destination should be selected for retrieving contextual content. In addition or alternatively, the content module 401 can retrieve different contextual content for the different destinations and then present the different contextual content by mixing or incorporating several experiences in one vehicle 101. For example, the different contextual content or experiences can be presented in sequence according to the estimated time of arrival at each destination. In another example, the different contextual content can be presented on presentation devices 109 nearest or surrounding the respective user or passenger to provide for distinct and individualized experiences.

The content can then be further adapted or prioritized for presentation based on the familiarity index as further described below. In other words, different contextual content can be shown for first-time visitors versus repeat visitors to the destination. For example, a first time visit to a doctor's office may include presenting introductory information about the doctor, but a second or subsequent visit can focus on contexts related to the actual procedure to be performed during the visit without introductory information. As another example, a first time visit to a museum may result in presenting relevant content for the most popular exhibits, while subsequent visits may focus of exhibits or areas of the museum that have not been previously visited by the user.

In one embodiment, the content module 403 can retrieve the content from any online provider including but not limited to the destination itself (e.g., via server operated by the destination or POI at the destination such but not limited to the services platform 115, services 117, and/or content providers 119). In addition or alternatively, content module 403 can retrieve the content from map content providers providing the geographic database 123 or equivalent. The contextual content can include but is not limited to map data for reconstructing rooms, physical environments, structures, etc. present or associated with the destination. Other types of contextual data can include but is not limited to video data (e.g., live video streams of a destination, historical videos, etc.), image data, audio data, textual data, encoded sensory data (e.g., smell data, touch data, etc.), and/or the like related to the determined context of the destination in order to provide the most immersive experience as possible according to the capabilities of the vehicle.

In one embodiment, the content module 403 can determine or receive an input for specifying an intent of the simulation of destination context. The content is then retrieved and/or adapted based on the intent. By way of example, the intent can include relaxing, preparing for an activity at the destination, and/or any other specified intent. In this way, the content module 403 can prioritize the retrieval of content classified or determined as associated with the intent. For example, content related to preparing for an activity may be more instructional (e.g., include illustrations or preparation activity, situation awareness, etc.), whereas context related to relaxing can include depict atmospheric or ambient aspects of contexts of the destination.

In one embodiment, one element is content selection based on the capabilities available in the autonomous vehicle 101. In other words, the content module 403 can determine what contextual content to retrieve based on what content is supported by the presentation devices 109 of the vehicle 101 of interest. To determine the presentation capabilities of the vehicle, the content module 403 can query the vehicle 101 itself or a data storing the capability data for the vehicle or vehicle type. The capability data can indicate the types of presentation devices 109, number of displays, sizes or displays, spatial arrangement of the displays, audio system capabilities (e.g., surround sound, frequency range), supported user interfaces (e.g., visual, audio, touch, haptic, smell, other sensory interfaces, etc.), supported data formats, available memory, available bandwidth, presentation systems (e.g., three-dimensional displays, augmented reality, virtual reality, etc.), user seating positions, etc.

In step 505, the adaptation module 405 adapts the contextual content to one or more presentation devices in the vehicle (e.g., based on the determined presentation capabilities of the presentation devices 109 of the vehicle 101). Because the contextual content can be retrieved from any number of online sources, the content is likely to be in variety of different formats, sizes, quality, etc. As a result, the content retrieved from these sources likely will need to be reformatted to fit the media or presentation capabilities available in the vehicle 101, e.g., screen sizes, resolutions, aspect ratios, screen arrangements for multiple screens, etc.

For this, the presentation platform 123 includes the adaptation module 405 as a dedicated module that takes care of the conversion from the original source to the target display/media in each respective vehicle 101. The adaption module 405, for instance, can include or have access to multiple conversion codecs, data on target formats, displays, media, interfaces, etc. for vehicles 101 of interest. In other embodiments, the adaption module 405 may transmit the content to external media converters along with conversion parameters specific to the vehicle 101 to initiate the adaption.

In one embodiment, the contextual content can be retrieved based on an adaptability to a user interface supported by the one or more presentation devices. For example, the user interface includes a video interface, an audio interface, a touch interface, another sensory interface, or a combination thereof. In this embodiment, the adaptation module 405 can interact with the content module 403 to specify what sizes or formats are supported or can be converted or adapted for display at a vehicle 101. The content module 403 will then select content that is supported or adapted for display. Adaptability can also refer to content being too low resolution or otherwise inappropriate for presentation at the vehicle 101 with a target level of quality. In other cases, adaptability can include avoiding the retrieval of content for user interfaces that are not supported by a vehicle 101 or a user. For example, if the user is hearing impaired, visual content can be prioritized over audio content; or if a vehicle 101 does not support touch-based content, such content can be avoided as well.

Figure 6:
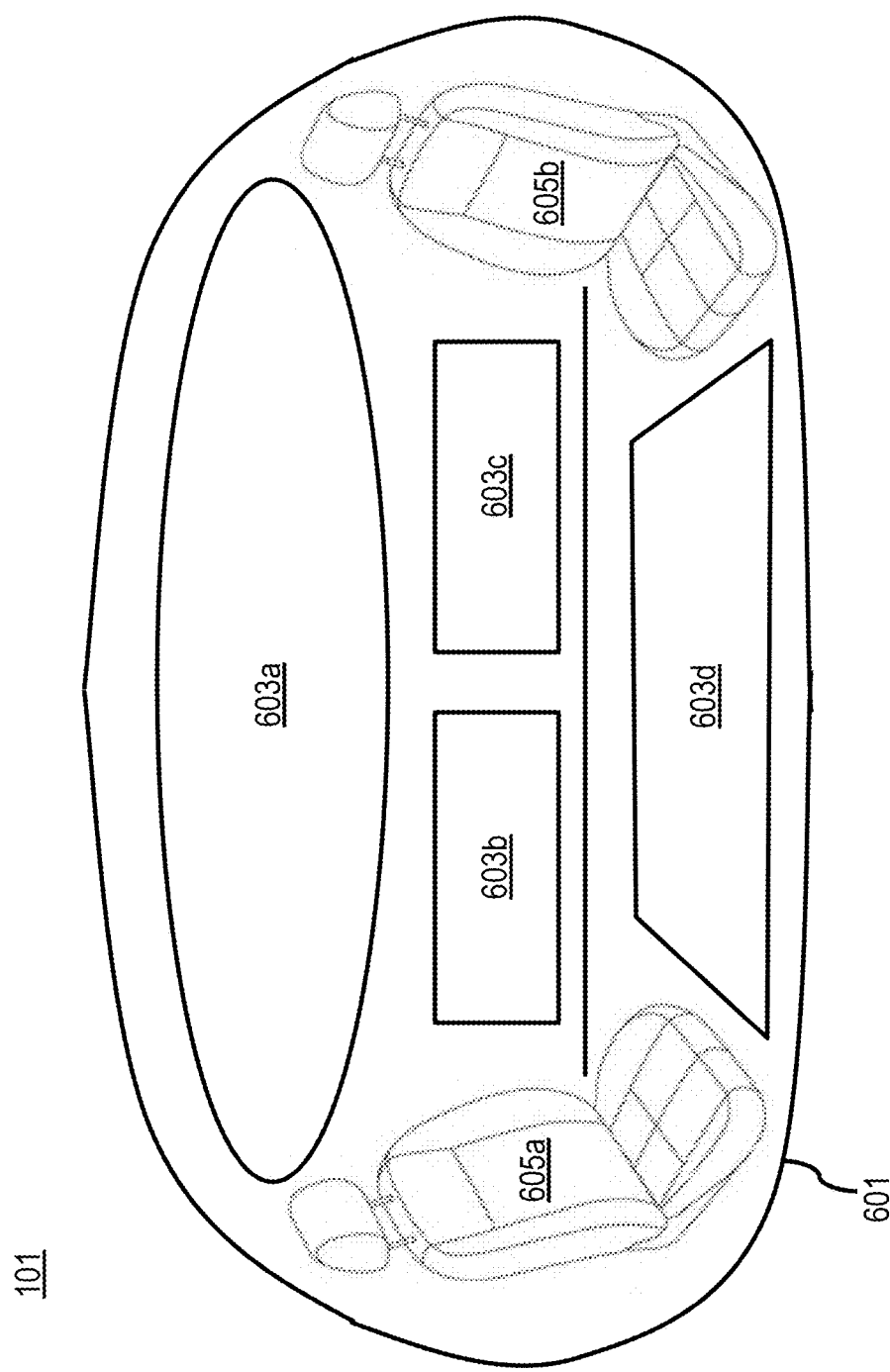
FIG. 6 is a diagram illustrating an example of different presentation devices and formats in a vehicle, according to one embodiment.

FIG. 6 is a diagram illustrating an example of different presentation devices and formats in a vehicle, according to one embodiment. In the example of FIG. 6, an autonomous vehicle 101 has a passenger compartment 601 in which several displays 603a-603d (examples of presentation devices 109) are mounted. The displays 603a-603d are of varying sizes and locations with display 603a being a large oval display on a vehicle side wall, displays 603b and 603c being smaller rectangular displays on the vehicle side wall, and display 603d being a large rectangular display on the vehicle floor. The adaptation module 405 can store data on the dimensions, resolutions, supported media formats, spatial arrangement, etc. of the displays 603a-603d to enable conversion of retrieved contextual content to the displays. For example, if the contextual content is a video showing the interior environment of a building, the adaptation module 405 can segment the video so that the same video can be displayed in a correct perspective across all displays 603a-603d from a viewer seated in either seat 605a or 605b of the passenger compartment 601.

Returning to the process 500 of FIG. 5, in step 507, the presentation module 407 initiates a presentation of the adapted content on the one or more presentation devices to provide a simulation of the at least one context associated with the destination as the vehicle 101 travels towards the destination. In one embodiment, simulation refers to presenting (e.g., displaying, playing, etc.) adapted content in a vehicle to recreate or give an indication of a context of the destination (e.g., visual environment, audio environment, people or things present at the destination, activity planned at the destination, etc.). For example, during the ride or vehicle trip, the presentation module 407 modifies the in-vehicle interior according to adapted content to present a story, theme, etc. to simulate, indicate, or otherwise recreate the context of the destination in the vehicle. In one embodiment, the adapted content can be applied to a story template to create a story-based presentation of the adapted contextual according to the presentation order or arrangement of specified in the template.

In one embodiment, the presentation of the adapted content can be initiated before a user enters the vehicle 101, enters inside the vehicle, exits outside the vehicle, or a combination thereof. For example, if the presentation is initiated before the user enters the vehicle, the interior of the vehicle can be modified to already show the adapted content so that the user receives an experience of entering the destination as the user starts his or her journey to the destination. If the presentation is initiated while the user is inside the vehicle, the presentation platform 123 can gradually transform the interior into the destination context by fading in the adapted contextual content as the vehicle drives towards the destination. In another embodiment, the presentation platform 123 can predict when the user is about to arrive and exit from the vehicle and then initiate the presentation a set time before the user exits. In yet another embodiment, if the vehicle is equipped with presentation devices 109 visible on the exterior of the vehicle, the adapted content can be presented on the outside of the vehicle before the user enters or after the user exits the vehicle.

In one embodiment, if the destination changes while the trip and presentation of the contextual content has started, the presentation platform 123 can reinitiate the process 500 to retrieve new contextual content of the new destination. Then, as the new contextual content is gradually retrieved and updated, the presentation platform 123 can reconfigure the vehicle 101 to adapt to or simulate the context of the new destination to transition to the new experience.

In one embodiment, the presentation platform 123 can monitor via vehicle sensor systems (e.g., cameras, microphones, heart rate sensors, movement sensors, touch sensors, etc.) the user's reaction to the presentation of the contextual content. In uses cases where the contextual content is used to prepare the user for a context, event, activity, etc. occurring at the destination, the presentation platform 123 can determine whether the sensed user reaction data match (e.g., within threshold tolerances) predetermined sensor data profiles for people or are prepared or not prepared for the corresponding context, event, activity, etc. For example, an increase of heart rate beyond a threshold value in response to experiencing a simulated Mill appointment may indicate that the user is not prepared for the actual Mill appointment. Based on the analysis of the user reaction data, the presentation platform 123 could suggest that the user is either "ready" or "not ready" to go to a specific location or destination (e.g., Mill) if the user reactions (e.g., indicated by video, audio, etc.) to related content are beyond threshold values. In one embodiment, if the user determined to be not ready, the presentation platform 123 can interact with the vehicle 101 to adapt the duration of the journey by selecting a longer route, driving around, driving more slowly, etc. to provide more time to adapt to the simulate experience.

In one embodiment, the presentation platform 123 can coordinate the presentation of the context content across multiple vehicles 101 that are traveling to the same destination the same or different starting locations. For example, the presentation platform 123 can retrieve and transmit the same contextual content to each of the multiple vehicle 101. The contextual content can then be adapted to the individual capabilities of each of the vehicles 101. In one embodiment, the presentation of the contextual content can be synchronized across the different vehicles 101 to provide for a more shared immersive experience.

In yet another embodiment, the presentation platform 123 enables a user to request or select a vehicle 101 (e.g., an autonomous vehicle) based on a desired level of experience with respect to simulating a destination context as not all vehicles 101 will have the same content presentation capabilities. For example, some vehicles 101 may simply have video screens for providing a basic level of immersion while other vehicles 101 may be equipped with presentation devices 109 that provide full immersion experiences such as but not limited to augmented or virtual reality experiences. For example, different industries (e.g., tourism, health, etc.) may have industry specific or tailored vehicles 101 that have specific equipment for providing a level of immersion targeted by the industry.

Accordingly, in one embodiment, the presentation platform 103 can track or interface with other services (e.g., shared vehicle services provided by the services platform 115, services 117, etc.) that track the locations and availability of vehicles 101 equipped for different levels of immersion experiences. The presentation platform 123 can find the most suitable vehicle 101 in direct vicinity to a user that provides the user with at least the level of immersion requested by the user. In one embodiment, the level of immersion can be requested instead by a responsible person or entity associated with the destination POI (e.g., a doctor). If no vehicle 101 is immediately available to meet the requested level of immersion, the presentation platform 123 can determine a compromise between the level of possible immersion with a given set of currently available vehicles 101 versus waiting a time period (e.g., a few days or weeks) for an immersive experience in a vehicle 101 that can fully meet the requested level of immersion.

Figure 7:
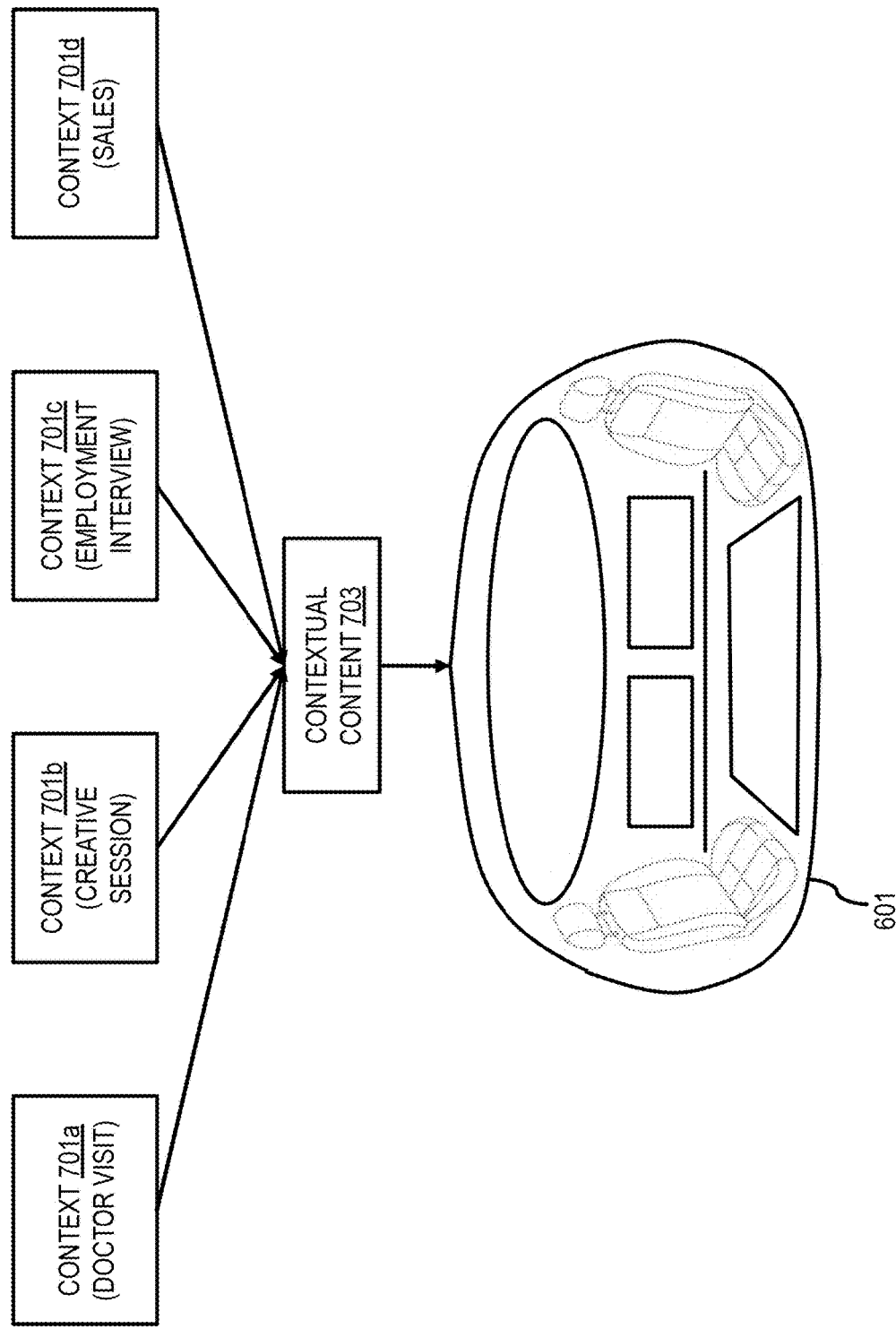
FIG. 7 are diagrams illustrating example contextual content presented during a vehicle trip, according to one embodiment.

FIG. 7 are diagrams illustrating example use cases for presenting contextual content during a vehicle trip, according to one embodiment. The examples of FIG. 7 illustrate a few example use cases for which retrieving content about the destination to simulate a context about the destination could be useful. These examples are provided by way of illustration and not as limitations.

In a use case with context 701a (as described above), a child is going for a doctor visit for an Mill examination. The presentation platform 123 can use the context 701a to select contextual content 703 related to the Mill machine, sounds, visuals, atmosphere, medical personnel that will be in attendance, doctor's face, etc. for presentation on the presentation devices in the vehicle 101 to simulate or prepare for the experience of taking an Mill scan.

In a use case with context 701b, a user is going to a destination for a creative session (e.g., a brainstorming session, attend the theater, etc.). The presentation platform 123 can use the context 701b to select contextual content 703 related to the venue, the stage, where audience will be, etc., as well as to retrieve content comprising relevant exercises to make a warm-up session for the creative session (e.g., based on determining that intent is for preparing for an activity at the destination). The selected contextual content can then be presented on the presentation devices in the vehicle 101 to simulate or prepare for the experience of participating in the creative session.

In a use case with context 701c, a user is going to a destination for an employment interview in a new company. The presentation platform 123 can use the context 701c to select contextual content 703 related to the visuals about the offices, rooms, people, logos, etc. The selected contextual content can then be presented on the presentation devices in the vehicle 101 to simulate or prepare for the experience of undergoing the interview to make the interviewee familiar with the interview process and company.

In a use case with context 701*d*, a sales person is going to a destination to visit a new prospect company. The presentation platform 123 can use the context 701*d* to select contextual content 703 related to the visuals about the offices, rooms, people, products, etc. The selected contextual content can then be presented on the presentation devices in the vehicle 101 to simulate or prepare for the experience of conducting the sales visit at the new company.

As discussed above, the example use cases or contexts 701*a*-701*d* are provided as examples and not as limitations. Other example use cases can include but are not limited to: (1) a start-up founder going to a trade show and uses the system 100 to obtain a preview of the trade experience during a vehicle trip; (2) a person who is going to an airport but is afraid of flying and uses the system to preview the flight experience before arriving at the airport to help calm his or her fears; and (3) a student going to a university to take a test and uses the system 100 to relax by obtaining a preview of the test center environment, physical settings, seating layout, etc.

In one embodiment, the system 100 presents the contextual content associated with a destination using any interface available on the vehicle 101 including but not limited to an audio interface, and/or a visual interface with an two dimensional (2D), three dimensional (3D), augmented reality (AR), and/or a virtual reality (VR) view inside a vehicle, such as on a window (e.g., a vehicle windshield, a heads-up display, etc.) or in a display (e.g., a presentation device 109 built into the vehicle 101 such as an integrated dashboard or headrest display, or a handheld presentation device 109 such as a mobile phone, portable computer, and/or the like).

In one instance, the user interface could also be a headset, goggle, or eyeglass device used separately or in connection with a mobile device. In one embodiment, the system 100 can present or surface the contextual content about a destination in multiple interfaces simultaneously (e.g., presenting a 2D map, a 3D map, an AR view, a VR display, or a combination thereof). In one instance, the system 100 can present the contextual content through multiple interfaces within the vehicle 101 based on the location or positioning of the passengers (e.g., a windshield for passengers in the front seats and on side windows for passengers in the back seats). In one embodiment, the system 100 could also present the contextual content to a passenger through other media including but not limited to one or more sounds, haptic feedback, touch, or other sensory interfaces. For example, the system 100 could present the contextual content through the speakers of the vehicle 101. By way of example, the system 100 can move a car seat relative to presented contextual content to more accurately simulate or recreate the destination context in the vehicle 101. In some embodiments, the car seat can also be reconfigured in seating position, shape, height, attachments, etc. depending on vehicle capabilities. For example, if the destination is a dentist office for an appointment, the vehicle seat can be reconfigured to simulate a dentist chair while video or other contextual content is also presented in the vehicle 101 to provide a more immersive experience.

In one embodiment, the system 100 can identify what presentation devices 109 to use for presenting the contextual content via sensor data collected from one or more vehicle sensors 127. The sensor data may be collected using a sensor 127 configured to detect a user's or passenger's gaze, heartrate, sweat rate or perspiration level, eye movement, body movement, or a combination thereof. For example, the system 100 could track the eyes of a passenger to determine where or how to present contextual content about a destination to the user according to the embodiments described herein.

In one embodiment, the system 100 can use other contextual data to select or adapt contextual content. The contextual data may include, for example, mapping or route information, etc., passenger location and/or positioning within the autonomous vehicle, object movement information (e.g., static versus moving), status information (e.g., traffic light status, construction status, etc.), time of day, weather conditions, visibility, historical data, etc. In one embodiment, the system 100 collects the sensor data, contextual data, or a combination through one or more sensors such as camera sensors, light sensors, Light Imaging Detection and Ranging (Lidar) sensors, Radio Detection and Ranging (Radar), infrared sensors, thermal sensors, and the like, to determine the type/kind of the non-driving activities.

In one embodiment, the system 100 retrieves contextual content based on a relevance factor of the content with respect to a context of the destination. The relevance factor may be determined by the system 100 based on heuristics of allocating cue sequences taken from research. The determined relevance factor can be used to select or prioritize contextual content for presentation to the user, and/or determine a timing for surfacing the contextual content to the user.

In one embodiment, the presentation devices 109 or presentation platform 123 may provide interactive user interfaces for the contextual content. In this way, the contextual content can be interactive content that responses to user interactions through the user interface. For example, the user interface can present an interactive user interface element or a physical controller such as but not limited to a knob or roller ball-based interface, a pressure sensor on a screen or window whose intensity reflects the movement of time, an interface that enables gestures/touch interaction, an interface that enables voice commands, pedals or paddles of the autonomous vehicle, or a combination thereof. In one embodiment, the system 100 and the user interface element, e.g., a joystick, enable a passenger to leave feedback for the effectiveness presented contextual content.

As shown in FIG. 1, the system 100 comprises one or more vehicles 101 configured with one or more sensors 127, and one or more presentation devices 109 (e.g., UEs 111) having connectivity to the presentation platform 123 via the communication network 121. In one embodiment, the vehicles 101 are autonomous vehicles or highly assisted driving vehicles that can sense their environments and navigate within a travel network without driver or occupant input. Although the vehicles 101 are depicted as automobiles, it is contemplated the vehicle 101 may be an any type of transportation wherein a passenger is not in control of the vehicle's operation (e.g., an airplane, a drone, a train, a ferry, etc.). In one embodiment, the vehicle sensors 127 (e.g., camera sensors, light sensors, Lidar sensors, radar, infrared sensors, thermal sensors, and the like) acquire map data during operation of the vehicle 101 within the travel network for routing, historical mobility data collection, and/or destination prediction.

In one embodiment, the presentation devices 109 or UEs 111 can be associated with any of the types of vehicles or a person or thing traveling within the travel network. By way of example, the presentation device 109 or UE 111 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the presentation device 109 or UE 111 can support any type of interface to the user (such as "wearable" circuitry, etc.). In one embodiment, the one or more vehicles may have cellular or wireless fidelity (Wi-Fi) connection either through the inbuilt communication equipment or from the UE 111 associated with the vehicles 101. Also, the UEs 111 may be configured to access a communication network 121 by way of any known or still developing communication protocols.

In one embodiment, the UEs 111 include a user interface element configured to receive a user input (e.g., a knob, a joystick, a rollerball or trackball-based interface, a touch screen, etc.). In one embodiment, the user interface element could also include a pressure sensor on a screen or a window (e.g., a windshield of a vehicle 101, a heads-up display, etc.), an interface element that enables gestures/touch interaction by a user, an interface element that enables voice commands by a user, or a combination thereof. In one embodiment, the UEs 111 may be configured with various passenger sensors 127 for collecting passenger sensor or context data during operation of the vehicle 101 along one or more roads within the travel network. By way of example, the passenger sensors 127 are any type of sensor that can detect a passenger's gaze, heartrate, sweat rate or perspiration level, eye movement, body movement, or combination thereof, in order to determine a passenger context or response to contextual content.

In one embodiment, the presentation platform 123 has connectivity over the communication network 121 to the services platform 115 that provides one or more services 117. By way of example, the services 117 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, content providers 119 (collectively referred to as content providers 119) may provide content or data (e.g., including geographic data, contextual content, historical mobility data, etc.). The content provided may be any type of content, such as map content, contextual content, audio content, video content, image content, etc. In one embodiment, the content providers 119 may also store content associated with the geographic database 125, presentation platform 123, services platform 115, services 117, and/or vehicles 101. In another embodiment, the content providers 119 may manage access to a central repository of data, and offer a consistent, standard interface to data, such as a repository of the geographic database 125.

By way of example, as previously stated the vehicle sensors 127 may be any type of sensor. In certain embodiments, the vehicle sensors 127 may include, for example, a global positioning sensor for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., for detecting objects proximate to the vehicle 101), an audio recorder for gathering audio data (e.g., detecting nearby humans or animals via acoustic signatures such as voices or animal noises), velocity sensors, and the like. In another embodiment, the vehicle sensors 127 may include sensors (e.g., mounted along a perimeter of the vehicle 101) to detect the relative distance of the vehicle 101 from lanes or roadways, the presence of other vehicles, pedestrians, animals, traffic lights, road features (e.g., curves) and any other objects, or a combination thereof. In one scenario, the vehicle sensors 127 may detect weather data, traffic information, or a combination thereof. In one example embodiment, the vehicles 101 may include GPS receivers to obtain geographic coordinates from satellites 129 for determining current location and time. Further, the location can be determined by a triangulation system such as A-GPS, Cell of Origin, or other location extrapolation technologies when cellular or network signals are available. In another example embodiment, the one or more vehicle sensors 127 may provide in-vehicle navigation services.

The communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the presentation platform 123 may be a platform with multiple interconnected components. By way of example, the presentation platform 123 may include multiple servers, intelligent networking devices, computing devices, components and corresponding software for determining upcoming vehicle events for one or more locations based, at least in part, on signage information. In addition, it is noted that the presentation platform 123 may be a separate entity of the system 100, a part of the services platform 115, the one or more services 117, or the content providers 119.

By way of example, the vehicles 101, the UEs 111, the presentation platform 123, the services platform 115, and the content providers 119 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
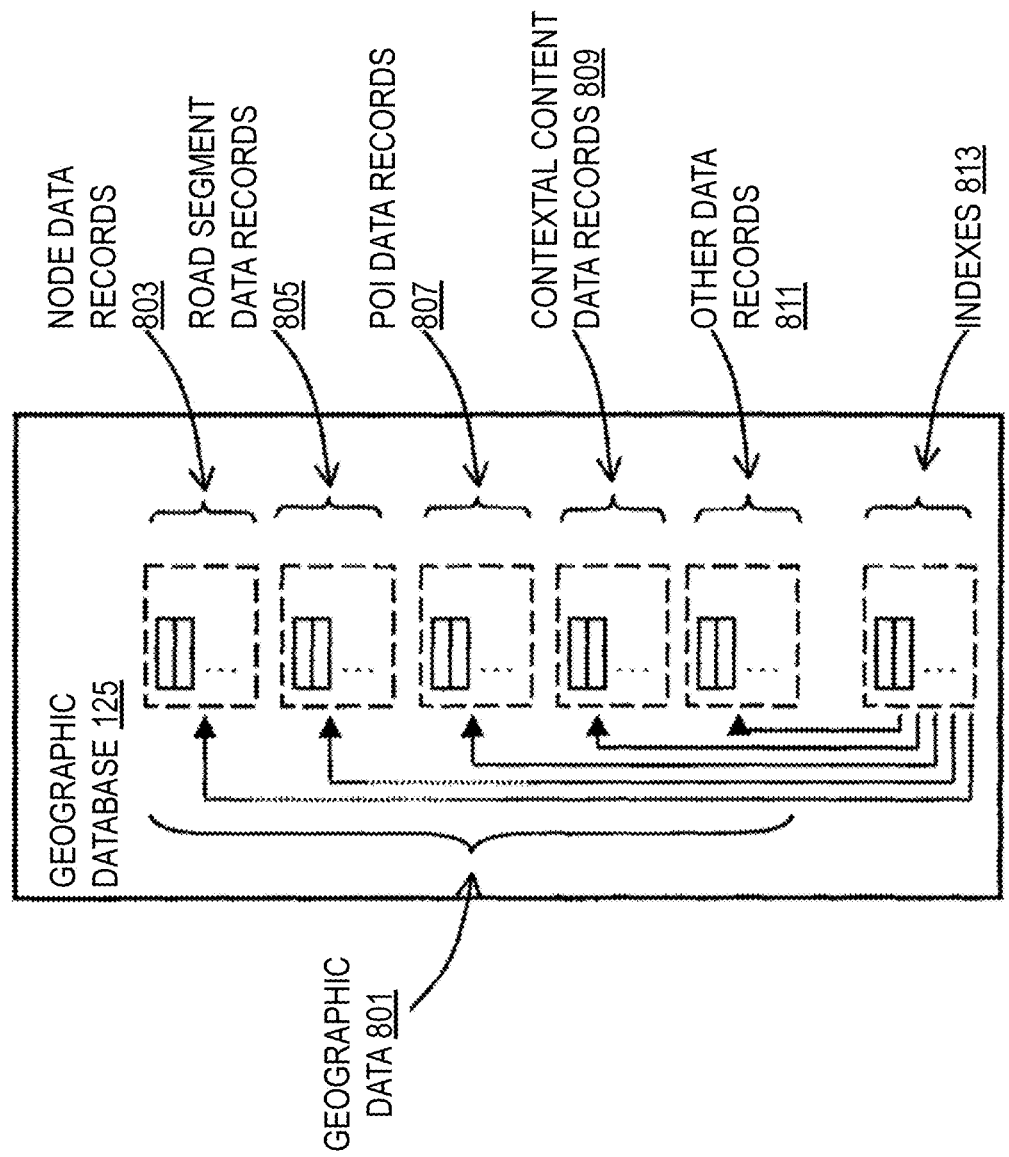
FIG. 8 is a diagram of a geographic database, according to one embodiment.

FIG. 8 is a diagram of a geographic database 125 capable of storing map data for dynamic population density predictions, according to one embodiment. In one embodiment, the geographic database 125 includes geographic data 801 used for (or configured to be compiled to be used for) mapping and/or navigation-related services.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 125.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 125 follows certain conventions. For example, links do not cross themselves and do not cross each other except at a node. Also, there are no duplicated shape points, nodes, or links. Two links that connect each other have a common node. In the geographic database 125, overlapping geographic features are represented by overlapping polygons. When polygons overlap, the boundary of one polygon crosses the boundary of the other polygon. In the geographic database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 801 of the database 125 includes node data records 803, road segment or link data records 805, POI data records 807, contextual content data records 809, other data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 125. In one embodiment, the indexes 813 may be used to quickly locate data without having to search every row in the geographic database 125 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. In addition, the geographic database 125 can contain path segment and node data records or other data that represent 3D paths around 3D map features (e.g., terrain features, buildings, other structures, etc.) that occur above street level, such as when routing or representing flightpaths of aerial vehicles 101 (e.g., drones), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 125 can include data about the POIs and their respective locations in the POI data records 807. The geographic database 125 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 125 can also include contextual content data records 809 for destination and/or user contexts, user familiarity index data, contextual content related to destination contexts, adapted contextual content, vehicle presentation capability data, and related data used according to the embodiment described herein. In one embodiment, the contextual content data records 809 can be associated with one or more of the node records 803, road segment records 805, and/or POI data records 807 so that the contextual content can inherit characteristics, properties, metadata, etc. of the associated records (e.g., location, address, POI type, etc.) of the corresponding destination or POI at selected destinations.

In one embodiment, the geographic database 125 can be maintained by the services platform 115 and/or any of the services 117 of the services platform 115 (e.g., a map developer). The map developer can collect geographic data to generate and enhance the geographic database 125. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles 101 (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 125 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing contextual content for an end-to-end seamless experience during a vehicle trip may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
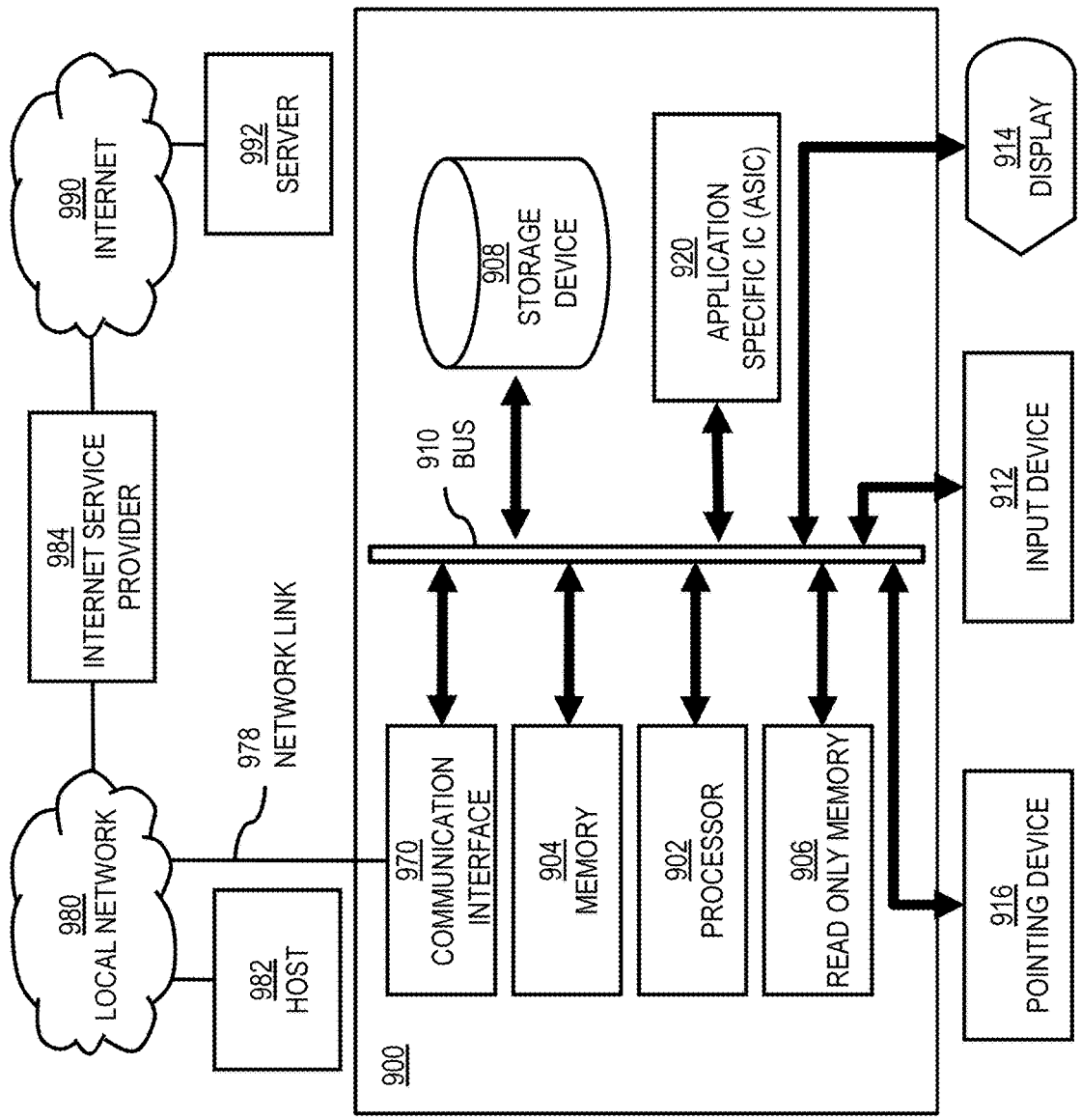
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide contextual content for an end-to-end seamless experience during a vehicle trip as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing contextual content for an end-to-end seamless experience during a vehicle trip. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. The processors 902 may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing contextual content for an end-to-end seamless experience during a vehicle trip. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing contextual content for an end-to-end seamless experience during a vehicle trip, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 121 for providing contextual content for an end-to-end seamless experience during a vehicle trip.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide contextual content for an end-to-end seamless experience during a vehicle trip as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide contextual content for an end-to-end seamless experience during a vehicle trip. The memory 1005 also stores the data associated with or generated by the execution of the inventive steps.

Figure 11:
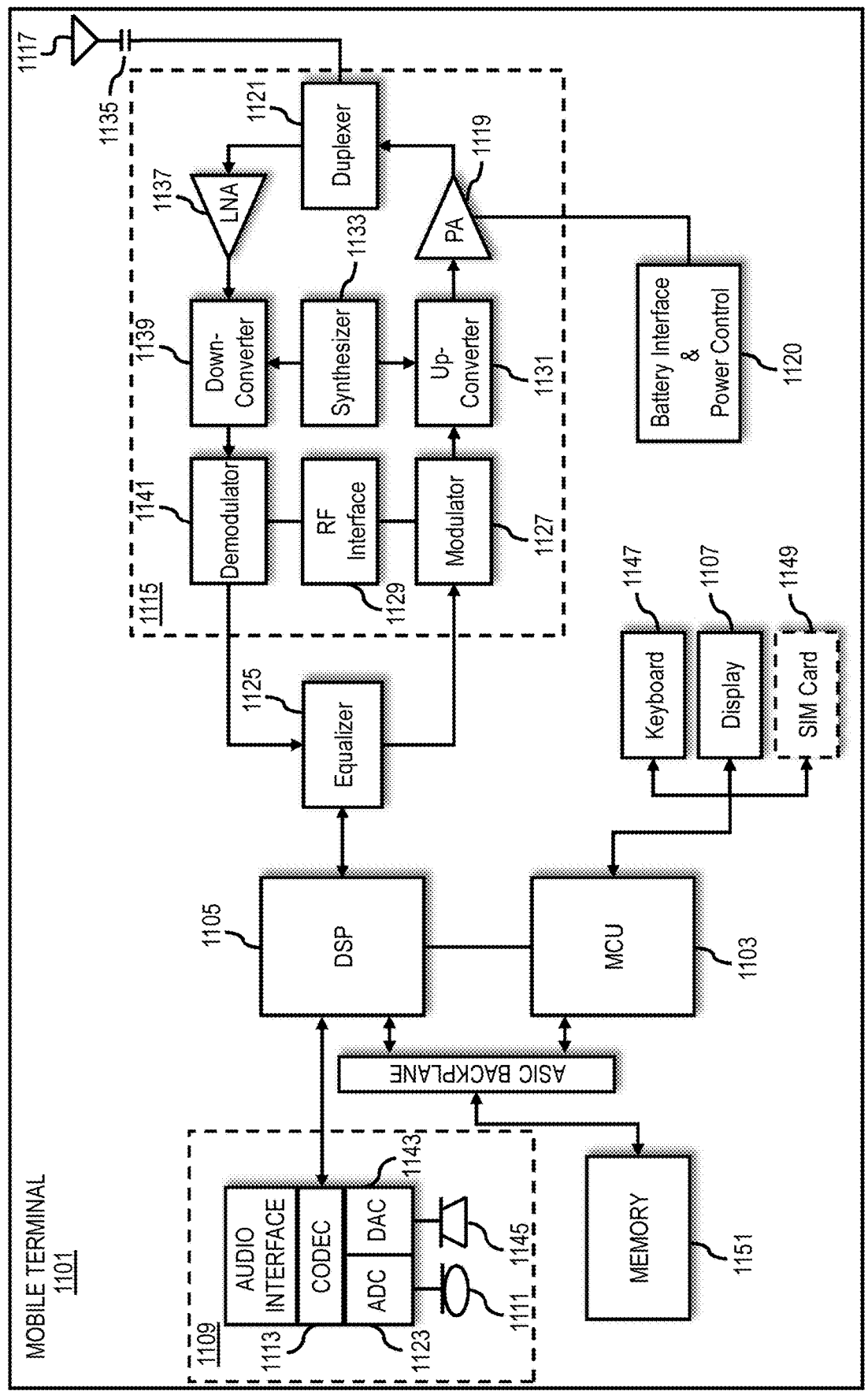
FIG. 11 is a diagram of a mobile terminal (e.g., presentation device of a vehicle) that can be used to implement an embodiment.

FIG. 11 is a diagram of exemplary components of a mobile terminal 1101 (e.g., a presentation device 109 such as a UE 111 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide contextual content for an end-to-end seamless experience during a vehicle trip. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the mobile station 1101. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   retrieving content related to at least one context associated with a destination of a passenger;
   adapting the content to one or more presentation devices of a vehicle associated with the passenger;
   initiating a presentation of the adapted content on the one or more presentation devices to provide a simulation of the destination of the passenger as the vehicle travels towards the destination, wherein the simulation comprises a story, a theme, or a combination thereof, that recreates the at least one context associated with the destination of the passenger; and
   processing historical mobility data of one or more users of the vehicle to compute a familiarity index,
   wherein the familiarity index indicates a familiarity level of the one or more users with the destination, and wherein the content is further adapted or prioritized for presentation based on the familiarity index.

2. The method of claim 1, further comprising:
   predicting the destination based on historical mobility data of a user of the vehicle.

3. The method of claim 1, wherein the content is retrieved based on an adaptability to a user interface supported by the one or more presentation devices, and wherein the user interface includes a video interface, an audio interface, a touch interface, another sensory interface, or a combination thereof.

4. The method of claim 1, wherein the presentation of the adapted content is initiated before a user enters the vehicle, inside the vehicle, outside the vehicle, or a combination thereof.

5. The method of claim 1, further comprising:
   determining or receiving an input for specifying an intent of the simulation,
   wherein the content is retrieved or adapted based on the intent.

6. The method of claim 5, wherein the intent includes relaxing, preparing for an activity at the destination, or a combination thereof.

7. The method of claim 1, wherein the at least one context includes a visual environment, an audio environment, people that may be encountered, items that may be encountered, an activity that may be encountered, or a combination thereof associated with the destination.

8. The method of claim 1, wherein the adaptation of the content comprises reformatting the content based on one or more capabilities of the vehicle, and wherein the vehicle is an autonomous vehicle.

9. The method of claim 1, wherein the passenger is within the vehicle, the method further comprising:
   reconfiguring one or more components of the vehicle to provide the simulation of the at least one context associated with the destination of the passenger.

10. The method of claim 9, wherein the one or more components include a seat of the vehicle, the passenger occupying the seat.

11. The method of claim 1, the method further comprising:
    adapting a route of the vehicle to the destination based on a reaction of the passenger to the simulation.

12. An apparatus comprising:
    at least one processor; and
    at least one memory including computer program code for one or more programs,
    the at least one memory and the computer program code configured to, with the at least one processor, cause the apparatus to perform at least the following,
    retrieve content related to at least one context associated with a destination of a passenger;
    adapt the content to one or more presentation devices of a vehicle associated with the passenger;
    initiate a presentation of the adapted content on the one or more presentation devices to provide a simulation of the destination of the passenger as the vehicle travels towards the destination, wherein the simulation comprises a story, a theme, or a combination thereof, that recreates the at least one context associated with the destination of the passenger; and
    process historical mobility data of one or more users of the vehicle to compute a familiarity index,
    wherein the familiarity index indicates a familiarity level of the one or more users with the destination, and wherein the content is further adapted or prioritized for presentation based on the familiarity index.

13. The apparatus of claim 12, wherein the apparatus is further caused to:
    predict the destination based on historical mobility data of a user of the vehicle.

14. The apparatus of claim 12, wherein adapting the content comprises reformatting the retrieved content to match the capabilities of the vehicle, and wherein the content is retrieved based on an adaptability to a user interface supported by the one or more presentation devices.

15. The apparatus of claim 12, wherein the passenger is within the vehicle, the apparatus further comprising:
    reconfigure one or more components of the vehicle to provide the simulation of the at least one context associated with the destination of the passenger, wherein the one or more components include a seat of the vehicle.

16. A non-transitory computer-readable storage medium for generating vulnerable road user data for a geographic database, carrying one or more sequences of one or more instructions which, when executed by one or more processors, cause an apparatus to perform:

retrieving content related to at least one context associated with a destination of a passenger;

adapting the content to one or more presentation devices of a vehicle associated with the passenger;

initiating a presentation of the adapted content on the one or more presentation devices to provide a simulation of the destination of the passenger as the vehicle travels towards the destination, wherein the simulation comprises a story, a theme, or a combination thereof, that recreates the at least one context associated with the destination of the passenger; and processing historical mobility data of one or more users of the vehicle to compute a familiarity index, wherein the familiarity index indicates a familiarity level of the one or more users with the destination, and wherein the content is further adapted or prioritized for presentation based on the familiarity index.

17. The non-transitory computer-readable storage medium of claim 16, further comprising:

predicting the destination based on historical mobility data of a user of the vehicle.

18. The non-transitory computer-readable storage medium of claim 16, wherein adapting the content comprises reformatting the retrieved content to match the capabilities of the vehicle, and wherein the content is retrieved based on an adaptability to a user interface supported by the one or more presentation devices.

\* \* \* \* \*